United States Patent
Newerla et al.

(10) Patent No.: US 9,575,474 B2
(45) Date of Patent: Feb. 21, 2017

(54) ACTUATING DRIVE, ACTUATING DRIVE SYSTEM, METHOD FOR OPERATING AN ACTUATING DRIVE, AND METHOD FOR OPERATING AN ACTUATING DRIVE SYSTEM

(71) Applicant: AUMA Riester GmbH & Co. KG, Mullheim (DE)

(72) Inventors: Henrik Newerla, Neuenburg (DE); Thomas Weber, Auggen (DE); Wilfried Platzer, Freiburg (DE); Benjamin Hofmann, Heitersheim (DE)

(73) Assignee: AUMA Riester GmbH & Co. KG, Müllheim (DE)

( * ) Notice: Subject to any disclaimer, the term of this patent is extended or adjusted under 35 U.S.C. 154(b) by 101 days.

(21) Appl. No.: 14/409,251

(22) PCT Filed: Jun. 19, 2013

(86) PCT No.: PCT/EP2013/001813
§ 371 (c)(1),
(2) Date: Dec. 18, 2014

(87) PCT Pub. No.: WO2013/189599
PCT Pub. Date: Dec. 27, 2013

(65) Prior Publication Data
US 2015/0192908 A1    Jul. 9, 2015

(30) Foreign Application Priority Data

Jun. 22, 2012    (DE) .................. 10 2012 012 515

(51) Int. Cl.
| | | |
|---|---|---|
| *G05B 11/36* | (2006.01) | |
| *H02J 9/00* | (2006.01) | |
| *G05B 19/042* | (2006.01) | |

(52) U.S. Cl.
CPC ............... *G05B 11/36* (2013.01); *H02J 9/002* (2013.01); *H02J 9/005* (2013.01); *G05B 19/0423* (2013.01)

(58) Field of Classification Search
CPC ..................................................... G05B 11/36
USPC ................................................. 318/635, 560
See application file for complete search history.

(56) References Cited

U.S. PATENT DOCUMENTS

| | | | | |
|---|---|---|---|---|
| 5,744,923 | A * | 4/1998 | Strauss | H02J 9/061 318/430 |
| 7,351,485 | B2 * | 4/2008 | Shioya | C01B 3/323 429/423 |
| 2013/0029580 | A1 * | 1/2013 | Furrer | G05B 19/0428 454/239 |

FOREIGN PATENT DOCUMENTS

WO    2011047490    4/2011

* cited by examiner

*Primary Examiner* — David S Luo
(74) *Attorney, Agent, or Firm* — Volpe and Koenig, P.C.

(57) ABSTRACT

In an actuating drive (1) having an electric motor (2) which is driven by a drive unit (4), it is provided to determine a state of charge of an intermediate circuit capacitor (5) of an intermediate circuit (3) which supplies the drive unit (4) and, depending on the determined state of charge, to adjust electrical power consumption by the electric motor (2) such that a critical state of charge of the intermediate circuit capacitor (5) can be avoided.

14 Claims, 3 Drawing Sheets

ACTUATING DRIVE, ACTUATING DRIVE SYSTEM, METHOD FOR OPERATING AN ACTUATING DRIVE, AND METHOD FOR OPERATING AN ACTUATING DRIVE SYSTEM

BACKGROUND

The invention relates to an actuating drive having an electric motor and a drive unit of the electric motor, which drive unit is fed from an intermediate circuit, wherein the intermediate circuit has at least one intermediate circuit capacitor.

The invention also relates to an actuating drive system, comprising at least one actuating drive and at least one energy-providing arrangement, wherein the at least one energy-providing arrangement is designed to supply electric energy to the at least one actuating drive.

The invention also relates to a method for operating an actuating drive, wherein an intermediate circuit capacitor feeds a drive unit of an electric motor of the actuating drive.

The invention lastly relates to a method for operating an actuating drive system, wherein at least one actuating drive of the actuating drive system is supplied with electric energy from at least one energy-providing arrangement of the actuating drive system.

Actuating drives of this type are known and have proven to be successful. They are used for example in systems in order to adjust armatures in a motor-driven manner.

Normally, these actuating drives are fed from a mains supply in the case of mains operation. In the event of a power cut-off or other disturbances, an energy store can be provided, which is dimensioned such that, for example, the drive can move into a safe state.

With the known actuating drives, a generator unit can be formed alternatively or additionally, with which electric energy can be generated manually in order to drive the electric motor. The energy store and/or generator unit form an energy-providing arrangement for operation in the event of a mains power failure.

With the known actuating drives, it was previously the case that the respective intermediate circuits were fed from an individually assigned energy supply. The energy-providing arrangement could thus be adapted optimally to the requirements of the actuating drive.

A safety controller for an actuator is known from WO 2011/047490 A2, in which safety circuits detect a breakdown of a supply voltage and give a signal for safety operation, with which a motor controller drives an associated flap into a safety position.

SUMMARY

The object of the invention is to increase the versatility of the configuration of systems with actuating drives.

In order to achieve this object, one or more features are provided in accordance with the invention. In particular, a monitoring unit is thus formed in an actuating drive of the type described in the introduction, with which monitoring unit a momentary state of charge of the intermediate circuit capacitor can be determined, and the drive unit is designed to set an electric power consumption of the electric motor in accordance with the determined momentary state of charge of the intermediate circuit capacitor. It is thus possible, for energy supply of the intermediate circuit, to provide different energy-providing arrangements, which can be dimensioned differently. This is because it is possible with the monitoring unit to avoid a breakdown of an intermediate circuit voltage across the intermediate circuit capacitor by reducing the electric power consumption of the electric motor in good time. A failure of the drive unit can be avoided in this way. This is particularly favorable with mains-independent operation in the event of a mains power failure.

In accordance with one embodiment of the invention, the drive unit may be designed to reduce the power consumption when, or so long as, the determined state of charge corresponds to a charge volume which is stored on the intermediate circuit capacitor and which reaches or falls below a predefined first threshold value. The drive unit is preferably designed in this case to reduce the power consumption below a required target value. Here, it is advantageous that it is possible to avoid a state in which an intermediate circuit voltage is no longer sufficient to supply the drive unit so as to be functional. Undefined states of the electric motor are thus avoidable, in particular in the event of a mains power failure, in which case a predefined driving position is to be adopted. By way of example, the required target value for a sought driving curve or driving position of the actuating drive can be calculated or predefined. A reduction of the power consumption for example means that the driving curve is left more slowly or the predefined driving position is adopted at a later moment in time. In this way it is possible, for example with manual emergency operation or with emergency operation supplied from an energy store and with a power-reduced driving curve, that an end position can be achieved, even if the energy volume provided manually or from the energy store is insufficient for a predefined driving curve.

In one embodiment of the invention, the drive unit may be designed to increase the power consumption when, or until, the determined state of charge corresponds to a charge volume which is stored on the intermediate circuit capacitor and which reaches or exceeds a predefined second threshold value. The drive unit is preferably designed to increase the power consumption to a required target value when, or until, the determined state of charge corresponds to a charge volume which is stored on the intermediate circuit capacitor and which reaches or exceeds a predefined second threshold value. Here, it is advantageous that a delayed departure from a driving curve can be accelerated again as soon as a sufficient energy volume for operation of the actuating drive is provided. The first threshold value may describe a critical state of charge, below which defined operation can no longer be ensured.

It is particularly favorable if the second threshold value is above the first threshold value. A hysteresis behavior can thus be set which avoids excessively frequent switching operations for the power consumption. The first and second threshold value may also be the same.

By way of example, a rule can be stored in the drive unit, in accordance with which the electric power consumption is reduced or can be reduced as soon as the first threshold value is undershot and in accordance with which the electric power consumption is increased or can be increased as soon as the second threshold value is exceeded.

A characteristic line can also be stored in the drive unit and assigns to each state of charge an upper limit value for the electric power consumption.

It is particularly favorable if the drive unit comprises a power electronics unit for driving the electric motor. Here, it is advantageous that the momentary power consumption of the electric motor can be set by suitable control of the power electronics unit.

In one embodiment of the invention, the monitoring unit may have at least one element of the group comprising means for measuring a voltage via the intermediate circuit capacitor, means for measuring a current flowing into the intermediate circuit and/or across the intermediate circuit capacitor, means for measuring a current flowing away from the intermediate circuit and/or from the intermediate circuit capacitor, and means for measuring a charge volume stored on the intermediate circuit capacitor. Here, it is advantageous that the state of charge of the intermediate circuit capacitor can be measured as voltage applied across the intermediate circuit capacitor, in particular as intermediate circuit voltage, and/or as a charge volume stored on the intermediate circuit capacitor and usable in order to set the electric power consumption of the electric motor. To this end, a control connection can be established between the monitoring unit and the drive unit. The charge volume can be determined for example from a difference of the integrated, measured currents.

Generally, a characteristic line can be stored in the drive unit and defines an upper limit for an electric power consumption of the electric motor at a momentary, or any, state of charge of the intermediate circuit capacitor. The drive unit can be designed such that the actual electric power consumption of the electric motor does not exceed the predefined upper limit.

In order to achieve the stated object and in accordance with the invention, the actuating drive is formed in an actuating drive system of the type mentioned in the introduction. Here, it is advantageous that actuating drives with different types of energy-providing arrangements can be combined in the actuating drive system, wherein a discharge of the intermediate circuit capacitor below a predefined level can be prevented, even in the event of a mains power failure, by limiting accordingly the power consumption of the electric motor by means of the drive unit.

The energy-providing arrangement is preferably formed for mains-independent supply of the at least one actuating drive. The actuating drive system can thus be operated at least in emergency operation even in the event of a mains power failure.

In accordance with one embodiment of the invention, the at least one energy-providing arrangement may have a generator unit. The generator unit can preferably be driven by muscle power, in particular manually. Here, it is advantageous that a self-sufficient energy supply can be provided in the event of a mains power failure, wherein undefined states of the actuating drive can be avoided with the invention, even with insufficient energy supply, for example in the case of physical exhaustion of a user.

In accordance with one embodiment of the invention, the at least one energy-providing arrangement has an energy store. The energy store is preferably designed such that it can be charged in mains operation, for example. Here, it is advantageous that emergency operation is then also enabled when a manual energy supply is not possible or is no longer sufficient.

In accordance with one embodiment of the invention, at least two energy-providing arrangements are formed, which can be used individually to supply the at least one actuating drive with electric energy. Here, it is advantageous that different locations can be used to provide electric energy, for example by muscle power. This may be advantageous for example when individual locations at which energy-providing arrangements are positioned can no longer be reached in case of emergency.

Alternatively or additionally, at least two energy-providing arrangements can be formed, which can be used jointly to supply the at least one actuating drive with electric energy. By way of example, two generator units drivable by muscle power can thus be usable to drive an actuating drive in the event of a mains power failure. Alternatively, a generator unit or energy-providing arrangement drivable by muscle power can be supported by an energy store, which for example is chargeable, of a further energy-providing arrangement. The energy store can also be used to homogenize an electric energy generated with a generator unit drivable by muscle power.

In accordance with one embodiment of the invention, at least two actuating drives can be formed, which can be supplied individually with electric energy from an energy-providing arrangement. An energy-providing arrangement can thus be used for example successively over time for the electric supply of a number of actuating drives in the event of a mains power failure. The electric supply of individual actuating drives can thus be safeguarded with a prioritization of the most important actuating drives.

To this end, priority information can be stored for each of the actuating drives of the actuating drive system, and the drive unit and/or at least one of the control arrangements for driving the actuating drives can be arranged in an order predefined by the priority information of the actuating drives.

Alternatively or additionally, at least two actuating drives can be formed, which can be supplied jointly with electric energy from an energy-providing arrangement. It is advantageous here that a greater number of actuating drives can be actuated in a shorter period of time in the event of a mains power failure.

In accordance with one embodiment of the invention, the at least one energy-providing arrangement is assigned a control arrangement, with which control arrangement the at least one actuating drive can be driven. It is advantageous here that the actuating drive can be controlled at the location of the energy supply in the event of a mains power failure. For example, the respective actuating drive can be switched over from mains operation to mains-independent operation by means of the control arrangement. The respective actuating drive can also be switched off using the control arrangement.

In accordance with one embodiment of the invention, at least two actuating drives are comprised, wherein the at least one control arrangement can be connected or is connected individually or jointly to the at least two actuating drives for drive. Here, it is advantageous that a control arrangement can be used to drive two actuating drives or more actuating drives successively over time or at the same time.

In accordance with one embodiment of the invention, a number of energy-providing arrangements and a number of actuating drives can be comprised, wherein a supply line is formed, by means of which each energy-providing arrangement of the number of energy-providing arrangements can be connected or is connected to each actuating drive of the number of actuating drives in order to supply the at least one actuating drive with electric energy. It is particularly favorable if the supply line is formed as a supply line that can be used simultaneously by at least two energy-providing arrangements, for example as an energy bus that can be connected or is connected to all energy-providing arrangements of the number of energy-providing arrangements. It is advantageous here that an electric energy flow in the actuating drive system can be configured or conducted with great flexibility. A required volume of electric energy can thus be fed as required to the individual actuating drives of the number of actuating drives in the event of a mains power failure. Due to the setting according to the invention of the electric power consumption in accordance with the state of charge of the respective intermediate circuit capacitor, it is made possible or ensured in a simple manner that a momentarily insufficient energy supply does not lead, in the event of a mains power failure, to the breakdown of the intermediate circuit voltage and therefore to an undefined operating state of the respective actuating drive.

In accordance with one embodiment of the invention, a number of control arrangements and a number of actuating drives may be comprised, wherein a control line is formed, by means of which each control arrangement of the number of control arrangements can be connected or is connected to each actuating drive of the number of actuating drives in order to drive the at least one actuating drive. The control line is preferably formed as a control line that can be used simultaneously by at least two control arrangements and/or by at least two actuating drives, for example as a control line bus connected or connectable to all control arrangements and/or all actuating drives of the actuating drive system. A large flexibility of the configurability or operability of the actuating drive system can thus be achieved.

Actuating drive systems that can be expanded in a modular manner can thus also be formed, in which additional energy-providing arrangements, additional actuating drives and/or additional control arrangements can be integrated easily. Due to the design according to the invention of the setting of the electronic power consumption of the electric motors of the individual actuating drives in accordance with the state of charge of the respective intermediate circuit capacitor, it is possible, even with subsequent integration of further actuating drives or energy consumers, that a breakdown of the intermediate circuit voltage across the actuating drives can be avoided in the event of a mains power failure, at least until a defined end position of the actuating drives is adopted.

An embodiment of independent inventive quality can be provided with an actuating drive system of the type described in the introduction or according to the invention in that the at least one control arrangement is connected in terms of control to a reading unit, wherein a control and/or supply connection of the control arrangement or an assigned energy-providing arrangement on the one hand to at least one actuating drive on the other hand can be unlocked with identification information read into the reading arrangement. By way of example, the control connection can be formed by portions or parts of the control line already described. By way of example, the supply connection can be formed by portions or parts of the supply line already described. It is advantageous that an unlocking of the different connections can be configured in accordance with a user authorization, which belongs to the identification information. For example, unauthorized use can thus be avoided.

In order to achieve the stated problem and in accordance with the invention, a momentary state of charge of the intermediate circuit capacitor is determined with a monitoring unit in the case of a method of the type mentioned in the introduction for operating an actuating drive, and a power consumption of the electric motor is set with the drive unit in accordance with the determined momentary state of charge. By way of example, the momentary state of charge can be determined as a charge volume which is stored on the intermediate circuit capacitor or as voltage applied across the intermediate circuit capacitor. Here, it is advantageous that a breakdown of an intermediate circuit voltage due to excessive power consumption of the electric motor with insufficient energy supply, for example in the event of a mains power failure, is avoidable. A defined operation of the actuating drive can thus be achieved, even in the event of exceptional circumstances, such as a mains power failure or damage.

In accordance with one embodiment of the invention, the power consumption can be reduced when, or so long as, the determined state of charge corresponds to a charge volume which is stored on the intermediate circuit capacitor and which reaches or falls below a predefined first threshold value. The power consumption is preferably reduced in this case below a required target value. This target value may be given for example from a predefined driving curve or a predefined driving position. The first threshold value is preferably a value for the charge volume of the intermediate circuit capacitor at which an intermediate circuit voltage has fallen below a critical value.

A limit value for the electric power consumption that is below the target value and that limits the electric power consumption upwardly or from above is thus set.

It may be that an upper limit value for the electric power consumption is read out from a stored characteristic line for each state of charge. Here, it is advantageous that the electric power consumption can be adapted in a simple manner to an existing energy volume or to an existing supply power in such a way that a breakdown of the energy supply during the control of the actuating drive or the actuating drives is avoidable.

In accordance with one embodiment of the invention, the power consumption can be increased when, or once, the determined state of charge corresponds to a charge volume which is stored on the intermediate circuit capacitor and which reaches or exceeds a predefined second threshold value. The power consumption here is preferably increased to a required target value. This target value can be given from a predefined driving curve or a predefined driving position to be adopted. Here, the second threshold value is preferably above the first threshold value and/or is fixed such that an associated intermediate circuit voltage is sufficient for failsafe operation of the actuating drive and in particular of the drive unit. It is advantageous with the embodiment that, in the event of a mains power failure, a desired operation of the actuating drive can be recovered as soon as the energy supply has increased or as soon as additional energy-providing arrangements are available or are made available.

In accordance with one embodiment of the invention, at least one step from the group of measuring a voltage across the intermediate circuit capacitor, measuring a current flowing into the intermediate circuit and/or across the intermediate circuit capacitor, measuring a current flowing off from the intermediate circuit and/or from the intermediate circuit capacitor, and measuring a charge volume stored on the intermediate circuit capacitor is performed in order to determine the momentary state of charge. Here, it is advantageous that an intermediate circuit voltage applied across the intermediate circuit capacitor can be measured directly or that, possibly by forming a differential of currents flowing in and out, a charge volume stored on the intermediate circuit capacitor can be measured or calculated directly. Simple possibilities are thus provided for determining the momentary state of charge of the intermediate circuit capacitor in order to set the momentary power consumption of the electric motor accordingly.

In order to achieve the object and in accordance with the invention, in the case of the method described in the introduction for operating an actuating drive system, a method according to the invention for operating an actuating drive is performed in the at least one actuating drive. Here, it is advantageous that, in the event of a mains power failure, a defined operation of the actuating drive can be ensured, at least until a predefined end position is reached.

The requirements of an energy-providing arrangement connectable in order to supply electric energy can thus be reduced. This increases the flexibility of the configuration of a system with actuating drives.

By way of example, the electric energy in the energy-providing arrangement can be provided by muscle power. Here, it is advantageous that the at least one actuating drive can be actuated in a self-sufficient manner in the event of a mains power failure. With the method according to the invention, it is possible to prevent the actuating drive driven using the energy-providing arrangement by muscle power from entering an undefined state, even with physical exhaustion of an actuator.

Alternatively or additionally, the electric energy in the energy-providing arrangement can be provided from an energy store. It is advantageous here that an independence from the physical condition of the operator can be achieved. It is advantageous here that an operation of an actuating drive system in the event of a mains power failure can be performed in automated operation without an operator.

In accordance with one embodiment of the invention, the at least two actuating drives can be controlled in an order predefined by stored priority information assigned to each of the at least two actuating drives. It is thus possible that more highly prioritized actuating drives are driven and actuated before actuating drives having lower priority. It is advantageous here that the energy provided or producible at the start of a mains power failure can be used for correct drive of actuating drives that are key for function.

In accordance with an embodiment of independent inventive quality, a control and/or supply connection can be established between at least one control arrangement and/or at least one energy-providing arrangement assigned to the control arrangement on the one hand and at least one actuating drive on the other hand and can be unlocked in accordance with identification information read into a reading unit. Here, it is advantageous that a system of authorizations can be defined by graded identification information, with which the actuating drive of the actuating drive system, for example in the event of a mains power failure, can be operated by operators having different levels of authorization.

BRIEF DESCRIPTION OF THE DRAWINGS

The invention will now be described in greater detail on the basis of an exemplary embodiment, but is not limited to this exemplary embodiment. Further exemplary embodiments will become clear by a combination of individual features or groups of features in the claims with one another or with individual features or groups of features of the exemplary embodiment.

In the drawings.

DETAILED DESCRIPTION OF THE PREFERRED EMBODIMENTS

Figure 1:
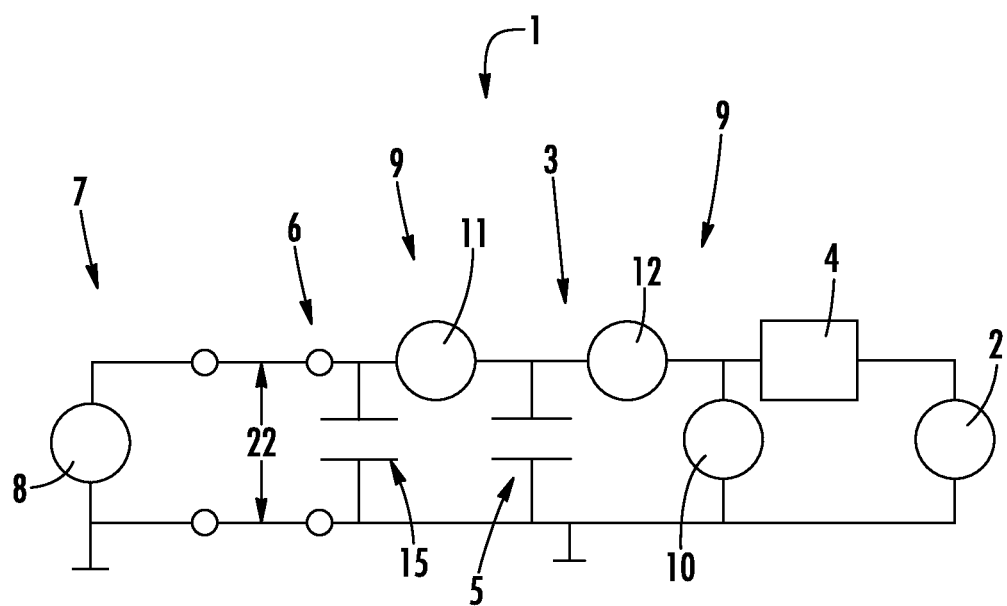
FIG. 1 shows a highly simplified circuit diagram of an actuating drive according to the invention.

FIG. 1 shows a drive, denoted on the whole by 1, which has an electric motor 2 and an intermediate circuit 3.

A drive unit 4 comprises, as is known per se, a power electronics unit (not illustrated in greater detail) for driving the electric motor 2 and is fed from the intermediate circuit 3.

The intermediate circuit 3 has an intermediate circuit capacitor 5, on which a charge volume is stored in order to supply the drive unit 4.

At an input 6, the actuating drive 1 is connected in the event of mains operation to a mains supply, and, in the event of a mains power failure or in the event of mains-independent operation, is connected to an energy-providing arrangement 7.

In FIG. 1 the intermediate circuit 3 is connected to an energy-providing arrangement 7 with a generator unit 8.

The generator unit 8 can be operated manually by means of muscle power and is used to charge the intermediate circuit capacitor 5.

The actuating drive 1 has a monitoring unit 9, with which a momentary state of charge of the intermediate circuit capacitor 4 can be determined.

To this end, the monitoring unit 9 has a means 10 for measuring the voltage via the intermediate circuit capacitor 5.

The monitoring unit 9 further has a means 11 for measuring the current flowing into the intermediate circuit 3 across the intermediate circuit capacitor 5. The current can also be measured by counting the flowing charge volume per unit of time or directly by measuring the current intensity.

The monitoring unit 9 further has a means 12 for measuring the current flowing from the intermediate circuit 3 from the intermediate circuit capacitor 5 to the drive unit 4. This can be achieved for example by measuring the current intensity or by measuring a transported charge per unit of time.

By forming a differential of the measurement results of the means 11 and 12, the charge stored on the intermediate circuit capacitor 5 or the associated voltage can be calculated as an alternative to the measurement result of the means 10. To this end, the transported charge or the flowing current is integrated over time.

Figure 2:
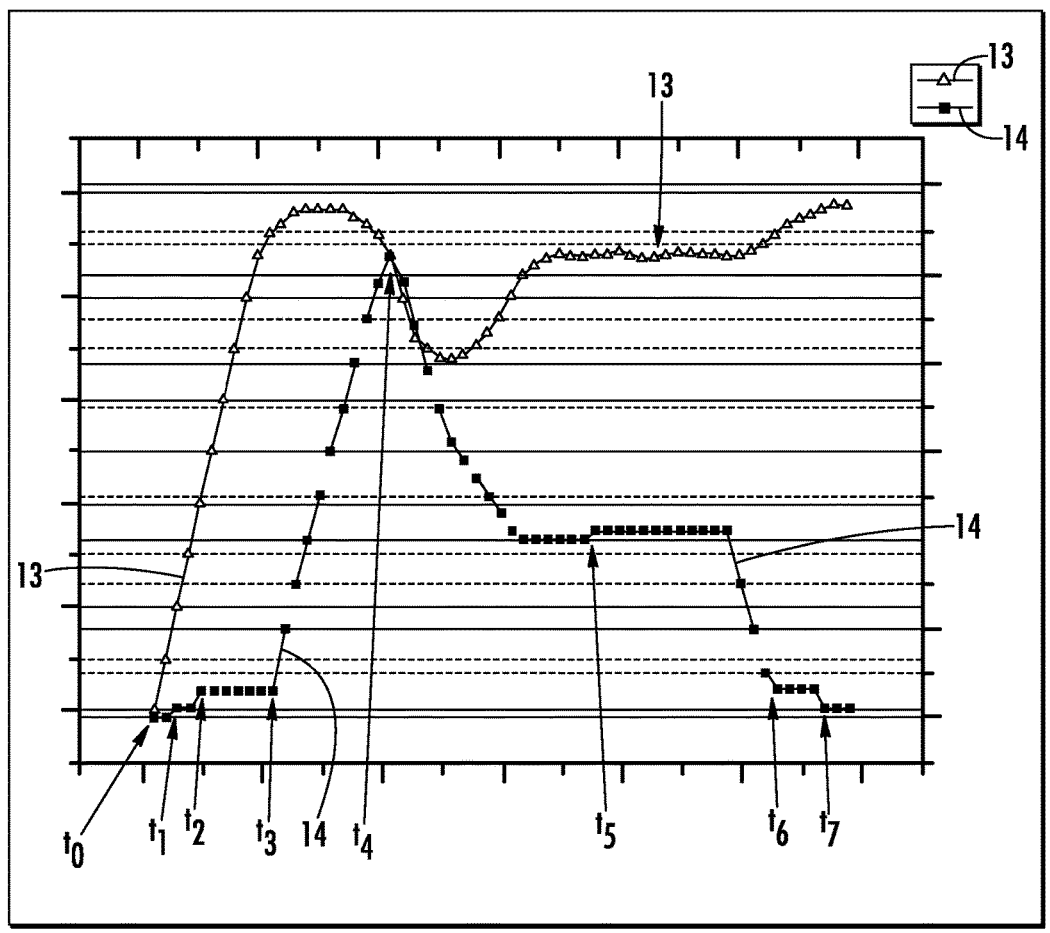
FIG. 2 shows the time curve of a momentary state of charge of an intermediate circuit capacitor of the actuating drive according to FIG. 1 and the time curve of a set electric power consumption of an electric motor from FIG. 1 in order to explain the method according to the invention.

FIG. 2 shows the time curve 13 of the state of charge of the intermediate circuit capacitor 5 during operation. The qualitative curve is illustrated in highly simplified form by interconnected triangles in order to explain the method according to the invention.

The time curve 13 is given from the voltage measured or calculated with the monitoring unit 9 via the intermediate circuit capacitor 5.

The time curve 14 of the electric power consumption of the electric motor 2 with interconnected squares is also illustrated in FIG. 2. The time curve 14 of the electric power consumption is predefined by the drive unit 4 in accordance with the method according to the invention.

To explain the method according to the invention, it is assumed that no electric energy is provided from the energy-providing arrangement 7 or a mains supply at a moment in time to.

At this moment, the intermediate circuit capacitor 5 is therefore discharged, and the intermediate circuit voltage across the intermediate circuit capacitor 5 is zero. It is clear from FIG. 2 that the intermediate circuit voltage builds from the moment in time t0.

Following the start of the energy-providing arrangement 7, a minimum voltage across the intermediate circuit capacitor 5 is provided at a moment in time $t_1$, with which voltage the drive unit 4 can be started. At the moment in time $t_2$, the drive unit 4 is ready for use.

At the moment in time $t_3$, the monitoring unit 9 determines that the state of charge of the intermediate circuit capacitor 5 has exceeded a second threshold value.

The drive unit 4 can thus raise a limit of the electric power consumption of the electric motor 2. The electric power consumption of the electric motor 2 consequently rises, so as to produce a predefined driving curve up to a predefined driving position.

Due to this increased electric power consumption of the electric motor 2, the state of charge of the intermediate circuit capacitor 5 decreases. The intermediate circuit voltage thus reduces.

At the moment in time $t_4$, the monitoring unit 9 determines that the state of charge of the intermediate circuit capacitor 5 has fallen below a predefined first threshold value.

The drive unit 4, which is operatively connected to the monitoring unit 9, thus controls the electric motor 2 in such a way that the electric power consumption of the electric motor 2 decreases again.

This causes the state of charge of the intermediate circuit capacitor 5 and thus the intermediate circuit voltage to recover again.

At the moment in time $t_5$, the monitoring unit 9 determines that the state of charge of the intermediate circuit capacitor 5 has again exceeded the aforementioned second threshold value.

The drive unit 4 can thus again raise the upper limit value for the electric power consumption of the electric motor 2, such that the momentary electric power consumption of the electric motor 2 increases.

At the moment in time $t_6$, the approach position predefined by the driving curve is reached, and the electric power consumption of the electric motor 2 reduces again.

The state of charge of the intermediate circuit capacitor 5 thus recovers again, and the intermediate circuit voltage rises again.

At the moment in time $t_7$, the communication of the drive unit 4 with a position triggering the journey is terminated and the drive unit 4 passes into a rest state.

It can thus be seen clearly from FIG. 2 that the power consumption is reduced between the start of the journey at the moment in time $t_3$ and the end of the journey at the moment in time $t_6$, once and so long as the determined state of charge of the intermediate circuit capacitor 5 corresponds to a charge volume which is below a first threshold value. It can also be seen that the power consumption is increased once and so long as the determined state of charge of the charge volume stored on the intermediate circuit capacitor 5 exceeds a second threshold value.

In this way, the actuating drive 1 can easily utilize optimally the electric energy provided from the energy-providing arrangement 7 in order to perform a predefined driving curve.

In other words, with the exemplary embodiment and on the whole with the invention, the momentary electric power consumption is set by the drive unit 4 such that the intermediate circuit voltage of the intermediate circuit capacitor 5 is regulated to a range between the first threshold value and the second threshold value.

To this end, the state of charge is determined with the means 10 by measuring the voltage across the intermediate circuit capacitor 5, or the charge volume stored on the intermediate circuit capacitor 5 is determined by integration of the currents measured with the means 11, 12 and by subsequent formation of a differential of the state of charge of the intermediate circuit capacitor 5.

It can also be seen in FIG. 1 that the actuating drive 1 has a dedicated energy-providing arrangement in the form of an energy store 15. This energy store 15 is a chargeable battery in the present case.

Figure 3:
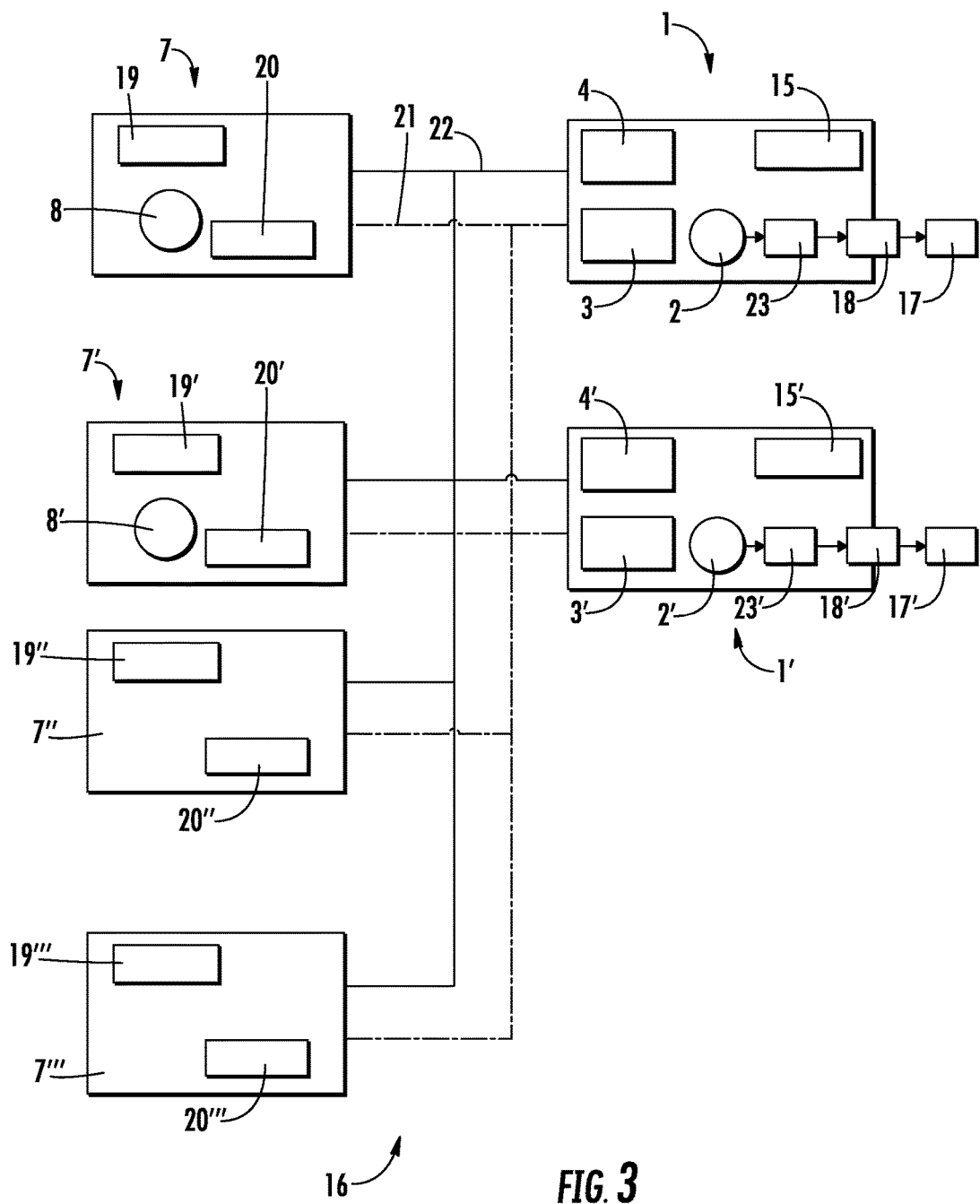
FIG. 3 shows a highly simplified block diagram of an actuating drive system according to the invention.

FIG. 3 shows a highly simplified schematic illustration of an actuating drive system denoted on the whole by 16.

It can be seen in FIG. 3 that the actuating drive 1 already described with reference to FIG. 1 is designed to actuate an armature 17.

To this end, the actuating drive 1 has, as is known per se, an output 18, via which the armature 17 can be actuated using the electric motor 2.

Furthermore, a transmission 23 can be arranged between the electric motor 2 and the armature 17.

The actuating drive system 16 also has a further actuating drive 1', which is formed similarly to the actuating drive 1 in terms of function and structure. The actuating drive 1' therefore also has an electric motor 2', an intermediate circuit 3', a drive unit 4', an intermediate circuit capacitor, an armature 17', a drive 18', a transmission 23' and further components, such as the actuating drive 1.

The components of the actuating drive 1' are therefore denoted by reference signs followed by an apostrophe and will not be described again separately. Rather, the explanations concerning the actuating drive 1 apply similarly to the actuating drive 1'.

The actuating drive system 16 further comprises an energy-providing arrangement 7. This energy-providing arrangement 7 has a generator unit 8, which can be actuated manually by means of muscle power in order to provide electric energy.

The energy-providing arrangement 7 additionally has an energy store 19, which can be charged with electric energy in order to provide said energy.

The actuating drive system 16 comprises a further energy-providing arrangement 7', which is formed similarly to the energy-providing arrangement 7. The explanations concerning the energy-providing arrangement 7 therefore apply similarly to the reference signs, followed by an apostrophe, of the energy-providing arrangement 7'.

A control arrangement 20 is formed on the energy-providing arrangement 7, with which control arrangement the actuating drive 1 and/or the actuating drive 1' can be driven.

To this end, the control arrangement 20 is connected to the actuating drive 1 and the actuating drive 1' via a control line 21. The control line 21 has a tree-shaped topology.

Other topologies can also be used.

The control line 21 is formed as a control bus, to which the actuating drives 1, 1' and the energy-providing arrangements 7, 7' are connected.

By suitable wiring of the control line 21, the actuating drives 1 and 1' can even be controlled simultaneously, for example synchronously, with the control arrangement 20 of the energy-providing arrangement 7.

Similarly, the energy-providing arrangement 7' has a control arrangement 20', with which the actuating drive 1 or the actuating drive 1' or both actuating drives 1, 1' jointly can be controlled selectively.

The drive with the control arrangements 20, 20' includes the departure from a predefined driving curve with the electric motors 2 and 2' in order to reach a predefined driving position, for example the end position with emergency shutdown.

To operate the actuating drives 1, 1', a supply line 22 also formed in a tree-shaped manner is formed, with which each of the energy-providing arrangements 7, 7' is connected to each of the actuating drives 1, 1' for supply with electric energy.

The actuating drive system 16 further has energy-providing arrangements 7" and 7'", which differ from the energy-providing arrangements 7 and 7' merely in that no generator unit 8, 8' is formed.

The energy-providing arrangements 7" and 7'" thus provide electric energy only from their respective energy stores 19" and 19'".

The energy-providing arrangement 7" and 7'" are also connectable via the control line 21 alternatively or jointly to an actuating drive 1, 1' or both actuating drives 1 and 1' jointly in order to drive the electric motors 2 and/or 2' accordingly.

The energy-providing arrangement 7" and 7'" are also connected to the supply line 22 in order to supply one or both of the actuating drives 1, 1' or further actuating drives (not illustrated) with electric energy in the event of a mains power failure.

In FIG. 3 it is not illustrated further that each of the energy-providing arrangements 7, 7', 7" and 7'" is coupled to a respective assigned reading unit.

Identification information can be read into the reading unit, for example by a chip card or an RFID chip or similar data carrier, in order to unlock a certain control connection between individual or a number of energy-providing arrangements 7, 7', 7" and 7'" on the one hand and one or more of the actuating drives 1, 1' on the other hand along the control line 21.

For the unlocked control connection, drive signals can then be transmitted to the respective actuating drive 1, 1' from the respective control arrangement 20, 20', 20", 20'".

With the identification information already mentioned, a supply connection between one or more of the energy-providing arrangements 7, 7', 7", 7'" on the one hand and one or more of the actuating drives 1, 1' can also be unlocked, such that a supply with electric energy can be provided via the unlocked supply connection.

Here, the individual users are assigned different identification information, and different authorization stages for operating the actuating drive system 16 can be defined in this way.

In the case of the actuating drive 1 with an electric motor 2 driven by a drive unit 4, it is proposed to determine the state of charge of an intermediate circuit capacitor 5 of an intermediate circuit 3 supplying the drive unit 4 and to set an electric power consumption of the electric motor 2 in accordance with the determined state of charge, such that a critical state of charge of the intermediate circuit capacitor 5 can be avoided.

The invention claimed is:

1. An actuating drive (1, 1') comprising an electric motor (2, 2') and a drive unit (4, 4') of the electric motor (2, 2'), said drive unit (4, 4') is fed from an intermediate circuit (3, 3'), the intermediate circuit (3, 3') has at least one intermediate circuit capacitor (5), a monitoring unit (9) with which a momentary state of charge of the intermediate circuit capacitor (5) is determinable, the drive unit (4, 4') is designed to set an electric power consumption of the electric motor (2, 2') in accordance with the determined momentary state of charge of the intermediate circuit capacitor (5), and the drive unit (4, 4') is designed to reduce the power consumption when, or so long as, the determined momentary state of charge corresponds to a predefined charge volume which is stored on the intermediate circuit capacitor (5) and which reaches or falls below a predefined first threshold value, wherein the drive unit (4, 4') is designed to reduce the power consumption below a required target value when, or so long as, the determined momentary state of charge corresponds to the predefined charge volume which is stored on the intermediate circuit capacitor (5) and which reaches or falls below the predefined first threshold value, or in that the drive unit (4, 4') is designed to increase the power consumption when, or once, the determined momentary state of charge corresponds to a charge volume which is stored on the intermediate circuit capacitor (5) and which reaches or exceeds a predefined second threshold value, or a characteristic line is stored in the drive unit (4, 4') and assigns to each of the states of charge an upper limit value for the electric power consumption.

2. An actuating drive (1, 1') comprising an electric motor (2, 2') and a drive unit (4, 4') of the electric motor (2, 2'), said drive unit (4, 4') is fed from an intermediate circuit (3, 3'), the intermediate circuit (3, 3') has at least one intermediate circuit capacitor (5), a monitoring unit (9) with which a momentary state of charge of the intermediate circuit capacitor (5) is determinable, the drive unit (4, 4') is designed to set an electric power consumption of the electric motor (2, 2') in accordance with the determined momentary state of charge of the intermediate circuit capacitor (5), and the drive unit (4, 4') is designed to reduce the power consumption when, or so long as, the determined momentary state of charge corresponds to a predefined charge volume which is stored on the intermediate circuit capacitor (5) and which reaches or falls below a predefined first threshold value, wherein the monitoring unit (9) has at least one element from the group comprising a voltage measuring device (10) for measuring a voltage via the intermediate circuit capacitor, a current flow measuring device (11) for measuring a current flowing into the intermediate circuit (3, 3') or across the intermediate circuit capacitor (5), (12) for measuring a current flowing off from the intermediate circuit (3, 3') or from the intermediate circuit capacitor (5), and a charge volume measuring device for measuring a charge volume stored on the intermediate circuit capacitor.

3. An actuating drive system (16), comprising at least one actuating drive (1, 1') and at least one energy-providing arrangement (7, 7', 7", 7'"), wherein the at least one energy-providing arrangement (7, 7', 7", 7'") is designed to supply electric energy to the at least one actuating drive (1, 1'), and the actuating drive (1, 1') comprising an electric motor (2, 2') and a drive unit (4, 4') of the electric motor (2, 2'), said drive unit (4, 4') is fed from an intermediate circuit (3, 3'), the intermediate circuit (3, 3') has at least one intermediate circuit capacitor (5), a monitoring unit (9) with which a momentary state of charge of the intermediate circuit capacitor (5) is determinable, the drive unit (4, 4') is designed to set an electric power consumption of the electric motor (2, 2') in accordance with the determined momentary state of charge of the intermediate circuit capacitor (5), and the drive unit (4, 4') is designed to reduce the power consumption when, or so long as, the determined momentary state of charge corresponds to a predefined charge volume which is stored on the intermediate circuit capacitor (5) and which reaches or falls below a predefined first threshold value.

4. The actuating drive system (16) as claimed in claim 3, wherein the at least one energy-providing arrangement (7, 7', 7'', 7''') has at least one of a generator unit (8, 8'), which is drivable by muscle power, or a chargeable energy store (19, 19', 19'', 19''').

5. The actuating drive system (16) as claimed in claim 3, wherein at least two energy-providing arrangements (7, 7', 7'', 7''') are formed, which are usable individually or jointly to supply the at least one actuating drive (1, 1') with electric energy, or at least two actuating drives are formed, which are supplied individually or jointly with electric energy from at least one energy-providing arrangement (7, 7', 7'', 7''').

6. The actuating drive system (16) as claimed in claim 3, wherein the at least one energy-providing arrangement (7, 7', 7'', 7''') is assigned a control arrangement (20, 20', 20'', 20'''), with which control arrangement (20, 20', 20'', 20''') the at least one actuating drive (1, 1') is drivable, or at least two of the actuating drives (1, 1') are provided, wherein the at least one control arrangement (20, 20', 20'', 20''') is connectable or is connected to the at least two actuating drives (1, 1') individually or jointly for drive.

7. The actuating drive system (16) as claimed in claim 3, wherein a number of the energy-providing arrangements (7, 7', 7'', 7''') and a number of the actuating drives (1, 1') are provided, further comprises a supply line (22) usable simultaneously by at least two of the energy-providing arrangements (7, 7', 7'', 7''') is formed, by said supply line each of the energy-providing arrangements (7, 7', 7'', 7''') of the number of energy-providing arrangements (7, 7', 7'', 7''') is connectable or is connected to each of the actuating drives (1, 1') of the number of actuating drives (1, 1') in order to supply the at least one actuating drive (1, 1') with electric energy, or a number of control arrangements (7, 7', 7'', 7''') and a number of actuating drives (1, 1') are comprised, wherein a control line (21) preferably usable simultaneously by at least two control arrangements (20, 20', 20'', 20''') or by at least two actuating drives (1, 1') is formed, by which control line each control arrangement (20, 20', 20'', 20''') of the number of control arrangements (20, 20', 20'', 20''') is connectable or is connected to each actuating drive (1, 1') of the number of actuating drives (1, 1') in order to drive the at least one actuating drive (1, 1').

8. The actuating drive system (16) as claimed in claim 3, wherein priority information is stored for each of the actuating drives (1, 1'), and the drive unit (4, 4') or at least one of the control arrangements (20, 20', 20'', 20''') are designed to drive the actuating drives (1, 1') in an order predefined by the priority information of the actuating drives (1, 1').

9. A method for operating an actuating drive (1, 1'), comprising an intermediate circuit capacitor (5) of an intermediate circuit (3, 3') feeding a drive unit (4, 4') of an electric motor (2, 2') of the actuating drive (1, 1'), determining a momentary state of charge of the intermediate circuit capacitor (5) is determined with a monitoring unit (9), in that a power consumption of the electric motor (2, 2') with the drive unit (4, 4') in accordance with the determined momentary state of charge, and reducing the power consumption is reduced when, or so long as, the determined momentary state of charge corresponds to a charge volume which is stored on the intermediate circuit capacitor (5) and which reaches or falls below a predefined first threshold value, reducing the power consumption below a required target value when, or so long as, the determined momentary state of charge corresponds to a charge volume which is stored on the intermediate circuit capacitor (5) and which reaches or falls below a predefined first threshold value, or increasing the power consumption to a required target value when, or once, the determined momentary state of charge corresponds to a charge volume which is stored on the intermediate circuit capacitor (5) and which reaches or exceeds a predefined second threshold value, or an upper limit value for the electric power consumption is read out from a stored characteristic line for each state of charge.

10. A method for operating an actuating drive system (16), wherein at least one actuating drive (1, 1') of the actuating drive system (16) is supplied with electric energy from at least one energy-providing arrangement (7, 7', 7'', 7''') of the actuating drive system (16), and a method as claimed in claim 9 is carried out in the at least one actuating drive.

11. The method as claimed in claim 10, wherein the electric energy in the energy-providing arrangement (7, 7', 7'', 7''') is provided by muscle power or from an energy store (19, 19', 19'', 19'''), or both.

12. The method as claimed in claim 10, wherein the at least one actuating drive (1, 1') is supplied with electric energy jointly or alternatively from at least two of the energy-providing arrangements (7, 7', 7'', 7''') of the actuating drive system (16), or at least two of the actuating drives (1, 1') of the actuating drive system (16) are supplied individually or jointly with electric energy from one of the energy-providing arrangement (7, 7', 7'', 7''').

13. The method as claimed in claim 10, wherein at least two of the actuating drives (1, 1') of the actuating drive system (16) are driven jointly or alternatively by a control arrangement (20, 20', 20'', 20''') assigned to the at least one energy-providing arrangement (7, 7', 7'', 7'''), or the at least two actuating drives (1, 1') are driven in an order predefined by stored priority information assigned to each of the at least two actuating drives (1, 1').

14. A method for operating an actuating drive (1, 1'), comprising an intermediate circuit capacitor (5) of an intermediate circuit (3, 3') feeding a drive unit (4, 4') of an electric motor (2, 2') of the actuating drive (1, 1'), determining a momentary state of charge of the intermediate circuit capacitor (5) is determined with a monitoring unit (9), in that a power consumption of the electric motor (2, 2') with the drive unit (4, 4') in accordance with the determined momentary state of charge, and reducing the power consumption is reduced when, or so long as, the determined momentary state of charge corresponds to a charge volume which is stored on the intermediate circuit capacitor (5) and which reaches or falls below a predefined first threshold value, performing at least one step from the group of measuring a voltage across the intermediate circuit capacitor (5), measuring a current flowing into the intermediate circuit (3, 3') or across the intermediate circuit capacitor (5), measuring a current flowing off from the intermediate circuit (3, 3') or from the intermediate circuit capacitor (5), or measuring a charge volume stored on the intermediate circuit capacitor (5) in order to determine the momentary state of charge.

* * * * *